PHOTOGRAPHIC CAMERA WITH CONTACT ARRANGEMENT IN THE ACCESSORY SHOE AND AT OTHER PLACES OF THE CAMERA
Filed Oct. 7, 1964
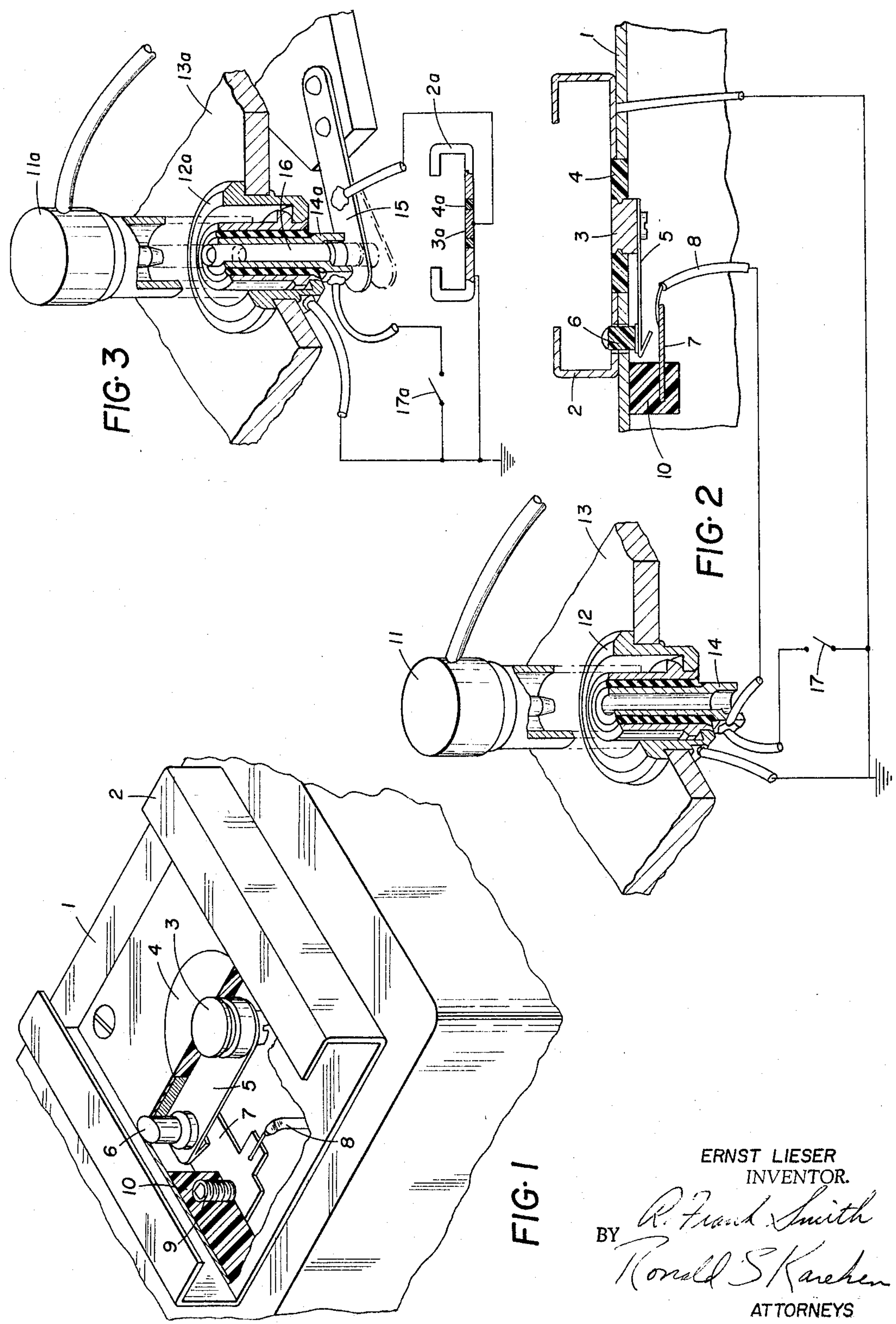
ERNST LIESER
INVENTOR.
BY R. Frank Smith
Ronald S. Karchen
ATTORNEYS United States Patent Office 3,286,612

Patented Nov. 22, 1966

3,286,612

PHOTOGRAPHIC CAMERA WITH CONTACT ARRANGEMENT IN THE ACCESSORY SHOE AND AT OTHER PLACES OF THE CAMERA

Ernst Lieser, Stuttgart-Vaihingen, Germany, assignor to Eastman Kodak Company, Rochester, N.Y., a corporation of New Jersey Filed Oct. 7, 1964, Ser. No. 402,084
Claims priority, application Germany, Dec. 18, 1963, K 51,663
2 Claims. (Cl. 95—11)

This arrangement relates to photographic cameras, and more particularly to photographic cameras having socket arrangements for receiving flash attachments and other electrically operated camera accessories.

Many photographic cameras include accessory shoes which are designed to receive camera accessories such as flash attachments and rangefinders. More recently, accessory shoes have also been designed to function as electrical sockets by the inclusion of electrical contacts within the shoes to cooperate with electrical terminals of the several available flash attachments which are insertable in the shoes, thereby eliminating the need for separate electrical cord connectors.

However, in order to provide a versatile camera, there is also provided a separate electrical socket in each camera for receiving the end plug of an electric cord or other available flash attachments.

Photographic cameras having both of these socket arrangements are known, but such cameras include the disadvantage of having the electrical contacts of the sockets in permanent electrical connection with each other. To illustrate, an operator of such a camera may decide to use an auxiliary electronic speed light having a cord connector and connect the light to the camera by using the cord plug. As soon as this connection is made, the entire ignition voltage of the electronic speed light becomes effective at the electrical terminals of the accessory shoe.

At this point, there exists a substantial danger to the camera operator through an accidental touching of the accessory shoe, because the voltage potential at these terminals is rather high.

Even in instances where a high voltage is not present, an accidental touching of the accessory shoe terminals will cause flashes to be released unintentionally through a bypassing of a shutter synchronizing switch normally included to provide properly timed flash firings.

The present invention overcomes these disadvantages by modifying the electrical socket arrangement at the accessory shoe so that its electrical connection will be interrupted whenever the accessory shoe is not being used.

An important object of the invention therefore resides in the provision of a photographic camera accessory shoe having an electrical socket arrangement which will be interrupted whenever the shoe is not being used.

Yet another object resides in the provision of a safe and reliable accessory shoe having an electrical socket arrangement which will accept existing camera accessories without modification or additional parts.

Other objects and advantages will become more apparent from the following description of the invention, the accompanying drawing forming a part thereof and wherein:

FIG. 1 is a partially broken perspective view of a camera accessory shoe embodying the present invention;

FIG. 2 shows a partial sectional front view of the accessory shoe of FIG. 1 and an associated electrical circuit with the cooperating cord plug socket; and FIG. 3 represents another cord plug socket arrangement suitable for use with the present invention.

Photographic cameras having accessory shoes with electrical contact arrangements are generally known, and in view of this, the present invention will be described by reference only to those elements directly related to a required understanding of the invention.

With respect to FIGS. 1 and 2, there is illustrated the top of a photographic camera housing 1 on which is located an accessory shoe 2 having a base and inwardly extending ends defining retaining channels, all of electrically conductive material. Centrally disposed within the center portion of the shoe 2 is a rigid electrical contact 3 of electrically conductive material spaced from the shoe 2 by an insulating ring 4. The shoe 2 comprises the other electrical contact by which the electrical circuit of a flash attachment having a foot contact arrangement may be completed whenever the foot of the flash attachment is inserted into the accessory shoe.

By the present invention, a flat resilient spring 5 of electrically conductive material is attached within the housing 1 at one end of the spring 5 to the inner end of center contact 3 by a screw or other appropriate means. The spring 5 includes at its other end an upright stud 6 of insulative material passing through a suitable cooperating bore in the housing 1 and shoe 2 to be accessible from outside the camera housing 1. As shown, stud 6 is positioned so that its exposed end is within one of the retaining channels of the accessory shoe 2. The exposed end of the stud 6 is also tapered downwardly toward the side of insertion of an accessory foot so that the stud will be moved down when the foot is inserted.

Below the spring 5 is a rigid contact plate 7, to which is soldered the end of an electrical wire 8 leading to one pole of a suitable camera shutter synchronizing switch 17, the other switch pole being electrically connected to the accessory shoe 2. The plate 7 is fixed by attachment with a screw 9 to an insulating block 10, and the spacing between the plate 7 and the lowermost point of spring 5 is less than the exposed height of stud 6. Thus, when an accessory foot is inserted into the shoe, the stud 6 causes the spring 5 to move downward sufficiently to engage the plate 7, thereby completing the circuit between the center contact 3 and the adjacent pole of the camera shutter synchronizing switch 17.

Referring now to FIG. 2, there is also shown a typical electrical cord plug 11 forming a part of a flash attachment, the plug 11 cooperating with a plug socket having coaxial contacts 12 and 14 and mounted, for example, on the front wall 13 of a photographic camera. As is usual, the outer contact 12 is electrically connected to the accessory shoe 2 and the other pole of switch 17, while the inner contact 14 is in permanent electrical contact with contact plate 7 and the one pole of switch 17.

It can be seen that whenever cord plug 11 is inserted, an electric potential is applied at the poles of switch 17. The electrical potential also would exist across contact 3 and shoe 2 if the added interrupter switch comprised of spring 5 and plate 7 were not present. Thus, an accidental simultaneous touching of the shoe 2 and the contact 3 would cause the switch 17 to be bypassed and result in an accidental firing of the flash.

With the inclusion of the present invention, the circuit to the accessory shoe is interrupted whenever no accessory foot is inserted, thereby preventing any accidental injury or flash actuation.

Often, a camera operator may also find it desirable to hold another accessory, such as a rangefinder, by means of the accessory shoe, while simultaneously using a separate flash attachment electrically connected to the camera by the cord plug socket. Since many such other accessories include foot inserts of electrically conductive material, even though electrical connection is not desired, an unintentional closed circuit bypassing the flash synchronizing switch may nevertheless result. Thus, the synchronizing switch is rendered ineffective, and a properly timed flash cannot be achieved as long as a conductive accessory foot is positioned in the shoe. As a means to correct this, although not in itself a part of this invention, there is shown in FIG. 3 a modified socket which will prevent a short circuiting of the switch and thereby enable simultaneous use of a flash attachment and another accessory in the shoe.

Referring to FIG. 3, parts having functions like those shown in FIGS. 1 and 2 have been given the same numerical designation with the letter *a* appended. Thus, the accessory shoe is represented generally by 2*a* whereas 3*a* and 4*a* designate, respectively, the center contact and the annular insulating separator. While the electrical contact arrangement shown in the accessory shoe in FIG. 3 represents a typical known arrangement, it is of course understood that a contact arrangement like that of the present invention as shown in FIGS. 1 and 2 is also usable.

The cord plug socket arrangement for receiving a typical cord plug 11*a* comprises a concentric outer contact element 12*a* and an inner contact element 14*a* of tabular shape cooperating with respective contacts of the plug 11*a*. As is shown, element 12*a* is electrically connected to shoe 2*a* and one pole of a shutter synchronizing switch 17*a*, whereas element 14*a* is engageable with a resilient contact plate 15 of conductive material, which in turn is electrically connected to the center contact 3 of shoe 2*a*. Element 14*a* is also in permanent electrical contact with the other pole of synchronizing switch 17*a*.

Centrally disposed within element 14*a* is a rod 16 of electrically insulative material. Rod 16 is fixed at one end to plate 15 and extends within element 14*a* such that its other end is adjacent to the accessible opening of element 14*a* on the outside of camera housing 13*a*. The rod 16 is slideable within element 14*a*, and upon insertion of a lead plug 11*a* from a flash attachment, it will be seen that the plug causes rod 16 to move downwardly, thereby breaking electrical connection between element 14*a* and plate 15 to open the circuit to the accessory shoe 2. Preferably, engagement of plate 15 with element 14*a* is broken prior to plug 11*a* being electrically connected to the elements 12*a* and 14*a* of the socket, and this can be accomplished by having the exposed end of rod 16 extend partially outside of the element 14*a*. Removal of plug 11*a* enables the resilient plate 15 to be returned to engagement with element 14 to again complete the circuit to the accessory shoe.

Thus, it can be seen that whenever the plug socket is used, the electrical socket arrangement at the accessory shoe becomes ineffective, and the shoe can be used for any other accessory as may be desired without danger of an ineffective shutter synchronizing switch.

Of course, this invention has been described with reference to a preferred embodiment, and variations can be practiced without departing from the spirit of the invention or the scope of the subjoined claims.

I claim:

1. In a photographic camera having an electrical circuit arrangement with a shutter synchronizing switch including a pair of electrically connectable poles and an electrical socket including a pair of terminals, each terminal connected to respective switch poles, the socket having means to receive the connector of a flash attachment having a lamp ignition voltage to apply the voltage at the switch poles, the improvement comprising:

(a) an accessory shoe in the circuit arrangement and including an electrically conductive base member connected to one socket terminal and the respective switch pole, the base member defining a central opening and having inwardly extending ends defining retaining channels to releasably retain a connecting foot of a camera attachment, (b) a contact member of electrically conductive material disposed within the base member opening and electrically insulative material separating the contact member and the base member, (c) a resilient plate spring of electrically conductive material having one end fixed to the contact member and the other end disposed below and spaced from the base member at one channel, (d) an electrical lead connected to the other socket terminal and respective switch pole and normally spaced from the said other end of the plate spring to interrupt the electrical circuit to the accessory shoe and prevent voltage applied through the socket from being effective at the base member and contact member, and (e) a slidable, electrically insulative stud fixed to the said other end of the plate spring and having a portion passing through the base member into the said one channel and positioned for downward sliding movement only upon use of the accessory shoe by insertion of an accessory foot to move the spring into engagement with the lead and electrically connect the contact member with the other socket terminal and respective switch pole, thereby completing the circuit for the accessory shoe and apply voltage to the base member and contact member only when the shoe is being used.

2. In a photographic camera according to claim 1, the improvement wherein the plate spring is biased toward the one said channel end and the stud defines a downward taper at the foot insertion side of the base member for engagement by the inserted foot.

References Cited by the Examiner

UNITED STATES PATENTS

| | | | |
|---|---|---|---|
| 2,611,069 | 9/1952 | Frazier | 200—51.09 |
| 2,910,573 | 10/1959 | Bing | 95—11.5 |

JOHN M. HORAN, *Primary Examiner.*